US012600579B2

(12) United States Patent
Bosboom et al.

(10) Patent No.: US 12,600,579 B2
(45) Date of Patent: Apr. 14, 2026

(54) APPARATUS, SYSTEM AND METHOD FOR CLAMPING COMPONENTS

(71) Applicant: JABIL INC., St. Petersburg, FL (US)

(72) Inventors: Jeroen Bosboom, St. Petersburg, FL (US); George Kovatchev, St. Petersburg, FL (US); Ward Palmer, St. Petersburg, FL (US); Babak Naderi, St. Petersburg, FL (US); Michael Patrick McKenney, St. Petersburg, FL (US); Lucas Nielsen, St. Petersburg, FL (US)

(73) Assignee: JABIL INC.

( * ) Notice: Subject to any disclaimer, the term of this patent is extended or adjusted under 35 U.S.C. 154(b) by 471 days.

(21) Appl. No.: 18/012,842

(22) PCT Filed: Jun. 25, 2021

(86) PCT No.: PCT/US2021/039080
§ 371 (c)(1),
(2) Date: Dec. 23, 2022

(87) PCT Pub. No.: WO2021/263100
PCT Pub. Date: Dec. 30, 2021

(65) Prior Publication Data
US 2023/0257215 A1 Aug. 17, 2023

Related U.S. Application Data

(60) Provisional application No. 63/043,895, filed on Jun. 25, 2020.

(51) Int. Cl.
*B65G 47/90* (2006.01)
(52) U.S. Cl.
CPC .................................. *B65G 47/907* (2013.01)

(58) Field of Classification Search
CPC .. B25J 15/0028; B25J 15/086; B25J 15/0226; B25J 15/028; B25J 15/0666; B25J 15/0408
(Continued)

(56) References Cited

U.S. PATENT DOCUMENTS 2,757,953 A * 8/1956 Kunkel ................ A01D 87/003
267/179
2,915,861 A * 12/1959 Voullaire ................ B65B 11/54
53/217
(Continued)

FOREIGN PATENT DOCUMENTS

CN 104003185 8/2014
CN 105540170 5/2016
(Continued)

OTHER PUBLICATIONS

International Search Report for PCT/US2021/0039080, dated Oct. 15, 2021.
(Continued)

*Primary Examiner* — Ronald P Jarrett
(74) *Attorney, Agent, or Firm* — Riverside Law LLP

(57) ABSTRACT

An apparatus, system and method for providing a clamping system for a part associated with a pallet. The apparatus, system and method may include: two opposing jaws on the pallet, each comprising a gripper for gripping the part, and a jaw base. The jaw base may include: gearing that synchronizes actuation of the opposing jaws; and a roller distal from the gripper. The part-clamp may also include: a centering spring that compresses to put pressure against the other of the opposing jaws; and a cam off the pallet, comprising a cam shaft that drives a cam face into the rollers to actuate the two grippers.

16 Claims, 11 Drawing Sheets

(58) Field of Classification Search
 USPC ........................................... 294/106, 116, 16
 See application file for complete search history.

(56) References Cited

U.S. PATENT DOCUMENTS

| | | | | | |
|---|---|---|---|---|---|
| 4,949,961 | A | * | 8/1990 | Milano .................. | A63B 47/02 |
| | | | | | 473/133 |
| 5,163,246 | A | * | 11/1992 | Shaw ..................... | A01K 91/08 |
| | | | | | 43/43.12 |
| 5,743,377 | A | * | 4/1998 | Kronseder .......... | B65G 47/847 |
| | | | | | 198/470.1 |
| 6,145,904 | A | * | 11/2000 | Bellandi ............... | B65G 47/90 |
| | | | | | 294/203 |
| 2008/0296920 | A1 | * | 12/2008 | Kipping .............. | B25J 15/0213 |
| | | | | | 294/198 |
| 2011/0198198 | A1 | | 8/2011 | Michel | |
| 2012/0260955 | A1 | | 10/2012 | Winzinger | |
| 2013/0088031 | A1 | * | 4/2013 | Jones .................. | B25J 15/0028 |
| | | | | | 294/203 |
| 2013/0249229 | A1 | * | 9/2013 | Roberts ............... | B25J 19/0091 |
| | | | | | 294/198 |
| 2017/0057096 | A1 | * | 3/2017 | Saadat .................... | B25J 15/10 |
| 2019/0276175 | A1 | * | 9/2019 | Nava .................... | B65G 47/847 |

FOREIGN PATENT DOCUMENTS

| | | | | |
|---|---|---|---|---|
| CN | 107835786 | B | 4/2020 | |
| EP | 1867600 | * | 12/2007 | ............ B65G 47/90 |
| EP | 1867600 | A1 | 12/2007 | |

OTHER PUBLICATIONS

Written Opinion of the International Searching Authority for PCT/US2021/039080, dated Oct. 15, 2021.

International Preliminary Report on Patentability for PCT/US2021/039080, dated Mar. 14, 2017.

Chinese Office Action (including English translation) issued in App. No. CN202180059160 dated Apr. 30, 2025, 19 pages.

* cited by examiner

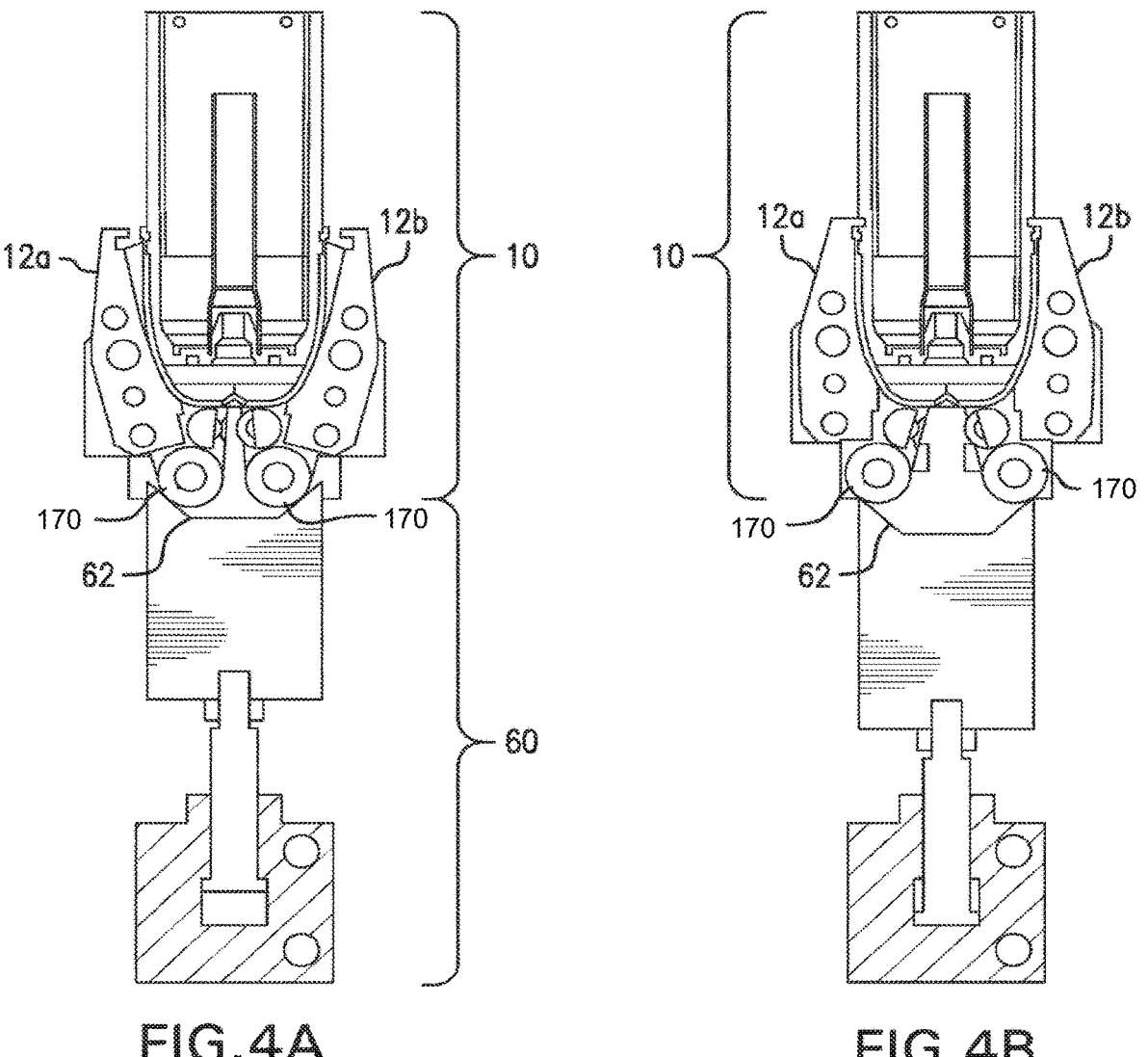
FIG.4A                    FIG.4B

APPARATUS, SYSTEM AND METHOD FOR CLAMPING COMPONENTS

CROSS-REFERENCE TO RELATED APPLICATION

This application claims the benefit of priority to International Application No. PCT/US2021/039080, filed Jun. 25, 2021, entitled: APPARATUS, SYSTEM AND METHOD FOR CLAMPING COMPONENTS, which claims priority to U.S. Provisional Application No. 63/043,895, filed Jun. 25, 2020, entitled APPARATUS, SYSTEM AND METHOD FOR CLAMPING COMPONENTS, the entireties of which is incorporated herein by reference as if set forth in its entireties.

BACKGROUND

Field of the Disclosure

The disclosure is directed to clamping components and, more particularly, to an apparatus, system and method for providing a self-clamping collet.

Description of the Background

The use of robotics is well established as a manufacturing expedient, particularly in applications where human handling is inefficient and/or ineffective-such as during the processing of small parts on a pallet along a conveyor system. Further, the temporary clamping and precision registration of small components to be assembled, fixtured or inspected, such as along a manufacturing line, is a ubiquitous work operation. For example, in the aforementioned context of a pallet moving along a high speed conveyor, it is understood that a work part must be positionally maintained, and thus positioning must be known at all times, to allow the part to be processed at each of a variety of in-line processing stations.

However, for typical high speed pallet conveyors, there are no provisions for air or electrical support associated with the pallet or its tooling. Thus, the addition of electric sensors or pneumatic cylinders on the pallet to provide, for example, automated assistance with the aforementioned requisite positional knowledge of the part would necessitate that addition of a battery or a reservoir tank to the pallet.

The typical solution provides a product pocket with a spring loaded clamp button on one side. This solution operates by letting go the part when the button is pushed, and this part release constitutes a dragging of the part out of its pocket. More specifically, the part is held in by friction, even after the button is pushed, and is thus "pushed" somewhat laterally until the part bottoms. This, of course, is not an ideal proposition for repeatable positioning.

Further, various other disadvantages are present in known systems due to the typical one-sided clamp solution. For example, if the pallet is inverted as occurs in some processes, heavier parts will simply drop out of the part pocket. Moreover, if the conveyor corners at high speed, the pocket friction provided by the clamp pressing from the other-side of the pocket may be overcome by the force of the conveyor acceleration, and therefore the part may be ejected mid-process.

Thus, the need exists for an improved clamping methodology for small parts on a pallet in a conveyor system.

SUMMARY

Certain embodiments are and include an apparatus, system and method for providing a clamping system for a part associated with a pallet. The apparatus, system and method may include: two opposing jaws on the pallet, each comprising a gripper for gripping the part, and a jaw base. The jaw base may include: gearing that synchronizes actuation of the opposing jaws; and a roller distal from the gripper. The part-clamp may also include: a centering spring that compresses to put pressure against the other of the opposing jaws; and a cam off the pallet, comprising a cam shaft that drives a cam face into the rollers to actuate the two grippers.

Thus, the disclosure provides at least an improved apparatus, system and method for an improved clamping methodology for small parts on a pallet in a conveyor system.

BRIEF DESCRIPTION OF THE DRAWINGS

The exemplary compositions, systems, and methods shall be described hereinafter with reference to the attached drawings, which are given as non-limiting examples only, in which:

FIG. 4 are illustrations of aspects of a self-clamping collet;

DETAILED DESCRIPTION

Figure 1A:
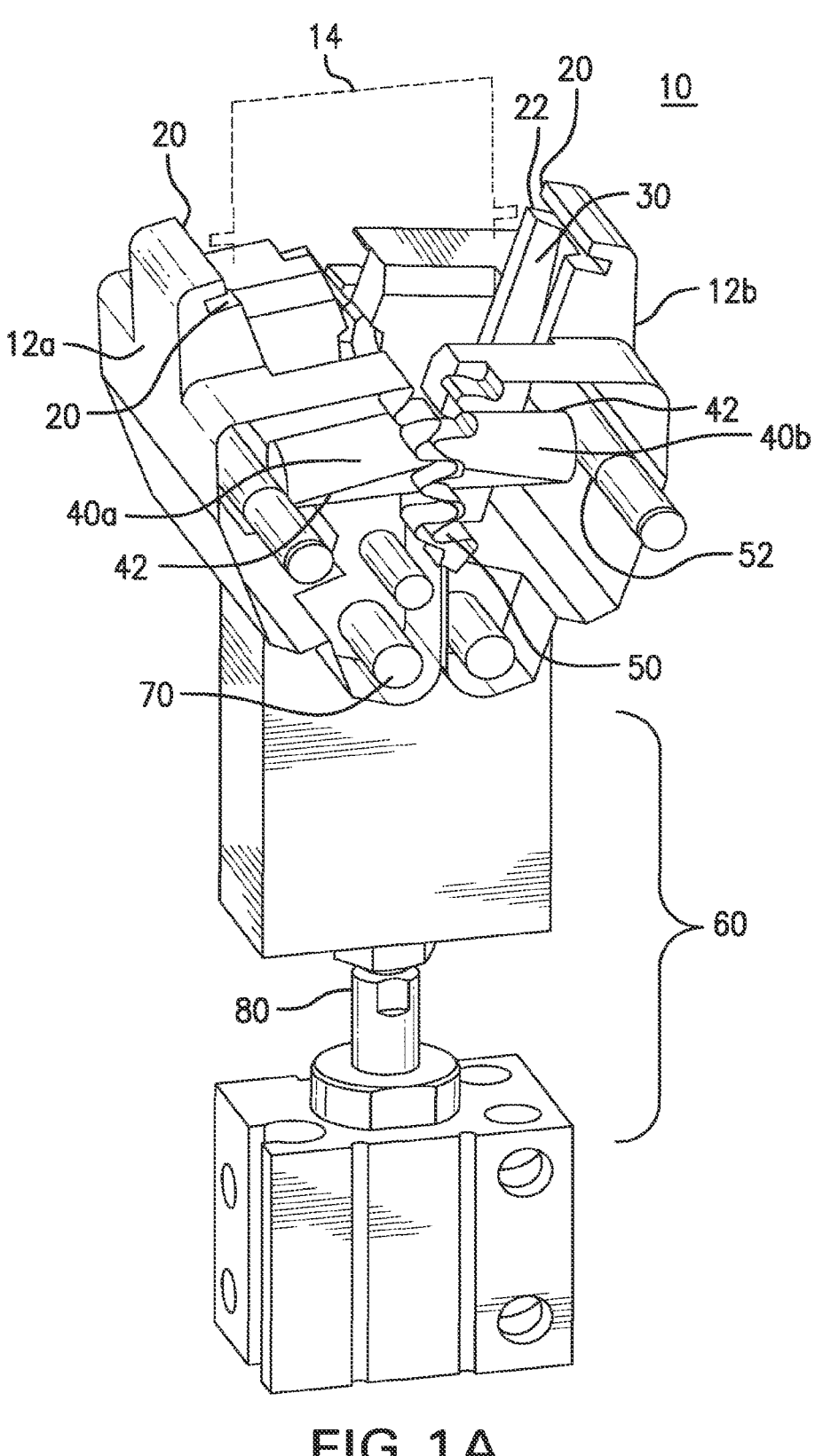
FIG. 1 are illustration of a self-clamping collet.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the disclosed embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "upon", "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Thus, terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

A clamping collet or grip is disclosed. More particularly, a self clamping collet is provided to close, such as by two or more synchronized centering jaws, about a part's base. The collet may include a central cavity that may form fit the part like a mold.

Yet more specifically, the grasping jaws may close about the outside of the part, and may be cammed closed (and open) via a cam shaft interfacing with the collet below the part. As an end effector drives the part into the jaws, the jaws may engage their respective matching faces and close onto the part. An external cam associated with, for example, a roller at the base of each jaw, is provided to open the jaws, and may also be used to close the jaws as the part is inserted.

The jaws may also include integral gearing on their respective inside faces. The gearing forces the jaws to open and close synchronously—that is, as the jaws are rotated about the spring point toward and away from each other, the gearing meshes and un-meshes to maintain synchronous positioning of each jaw.

Moreover, to provide the open and closed state of the jaws, a pair of compression springs against the jaw center/ synchronous gearing may be used. These springs may be captured in tapered hole pockets, facing each other. Thereby, as the jaws open, the spring deflects "over center" inside its respective pocket. The jaw travel may be mechanically limited so that the spring is held in this condition, thus keeping the jaws open (or closed). Accordingly, the jaws may be cammed open and cammed- or spring-loaded closed either manually, or robotically.

In order to release the part, an actuator may be pressed, such as from below, to eject the part by swinging the gripping jaw tips clear. As referenced, the jaws may be equipped with rollers such that the lower actuation cam may cam the jaw bases towards each other, thereby opening the jaws and thus ejecting the part. In each such case, the part is preferably positively ejected from the collet.

The disclosed self clamping collet thus opens and closes using external actuators, i.e., an external cam shaft, not mounted on the pallet. The disclosure thus solves the known art's problem of how to repeatably fixture a part, such as a molded plastic or complex shaped part, onto a pallet in a stable and repeatable way so that more operations may be performed on it and/or more components can be assembled to it. That is, the disclosed embodiments can readily hold complex and/or curved parts for processing.

The disclosed collet is unique in that it can be used for many different toolings that require an open and closed state, but which preferably avoid the use of expensive and complex jigs or multiple fixture clamps. The collet, and/or its jaws, may be inexpensively composed of 3D printed parts that are accurate and durable. The collet holds molded parts with similar precision to a full dedicated process mold, without the expense of developing dedicated molds for each part.

The embodiments may be used for part fixturing on a flat pallet, and may also provide be an assembly fixture, such as by stacking the disclosed part fixtures. For example, stacked fixturing collets may process an optical component sandwiched between multiple molded frames, wherein the molded frames are held in their respective self clamping collets while UV glue is applied, and the molded frames may then be fitted together about the optical component by the stacked collets until UV curing occurs.

Figure 1B:
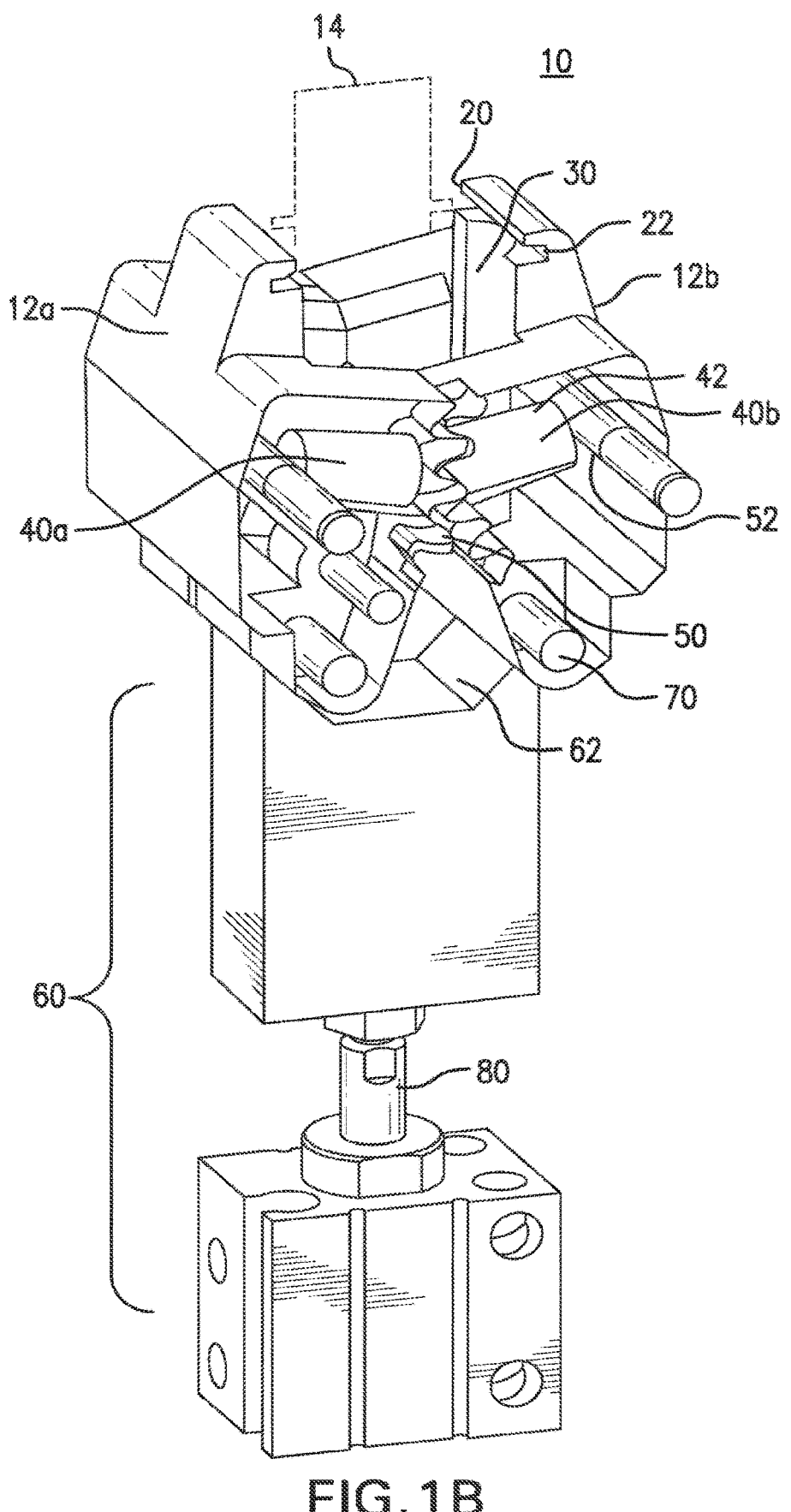

FIGS. 1A and 1B illustrate a self clamping collet 10 according to embodiments. FIG. 1A illustrates a jaw set 12a, b in the open position. FIG. 1B illustrates the jaw set 12a, b in the closed position. In the non-limiting example of FIGS. 1, the grasped component 14 is received and retained by the spring loaded jaws 12a, b, and the grasped component 14 may be accommodated in a molded area 16 at the core of the jaw set 12, b.

In the illustrations, the opposing jaws 12a, b each have a single grasping slot 22 below a retaining lip 20, although those skilled in the art will appreciate that the jaws' grasping configuration may be custom to each component 14 to be grasped, and may be different from the opposing jaw to the extent the component's contours demand such a configuration. Also shown is a part mold 30, and/or part cushion, capable of gently receiving a grasped part 14. This mold/cushion 30 may be formed of plastic or rubber, for example, and is capable of at least frictionally aiding in maintaining the position of the clamped component 14, while additionally protecting the component 14 from damage or dropping.

Also illustrated is an over-center spring configuration 40 (spring may be over-center or under-center, and may power jaws to close or to open). In short, each spring 40a, b, such as may comprise a compression spring or springs, resides within its spring pocket 42, which may be a tapered hole pocket to maintain the spring's position, "facing" the oppos-ing jaw's spring and between the center gearing 50 shared between the jaws 12*a, b* and a respective outer limiter 52 on each jaw 12*a, b*. Accordingly, the jaws 12*a, b* are rotated about the centered spring configuration 40, which retracts the jaws 12*a, b* to close in the illustrated configuration.

Of course, it will be appreciated that alternative embodi-ments may lack springs 40*a, b*, or may use other elements rather than springs 40*a, b*. By way of example, magnets or pneumatics may be used to provide passive, non-powered fixturing in place of springs 40*a, b* without departing from the disclosure.

The cam 60 in FIG. 1 may move the cam face 62 toward the jaws 12*a, b*, which causes the jaw bases 70 (and/or the rollers thereof) at the base of each jaw 12*a, 12b* to move to the cam face's center 62, thus opening the jaws 12*a, b*; and moves the cam face 62 away from the jaws 12*a, b* to either close the jaws (as each jaw base moves away from the other jaw base), or to allow for eventual actuation of the springs 40 (by pressure applied between the jaws) to close the jaws 12*a, b*. That is, the closing of the jaws 12*a, b* may be spring-tripped or cam-driven as illustrated.

Thus, to provide the open and closed state of the jaws, the pair of compression spring(s) against the jaw center/syn-chronous gearing may be cam-actuated. That is, as the jaws open, the spring deflects "over center" inside its respective pocket. The jaw travel may be mechanically limited so that the spring is held in this condition, thus keeping the jaws open (or closed). Accordingly, the jaws may be cammed open and cammed- or spring-loaded closed, and may be actuated either manually or robotically.

As the spring and/or cam actuate the jaws towards and away from each other, the illustrated gearing 50 meshes and un-meshes. This maintains synchronous positioning of each jaw12*a, b*. Gear-synchronization of the jaws 12*a, b*, ensures that neither jaw 12*a, b* can over-close or over-open the other.

Figure 1C:
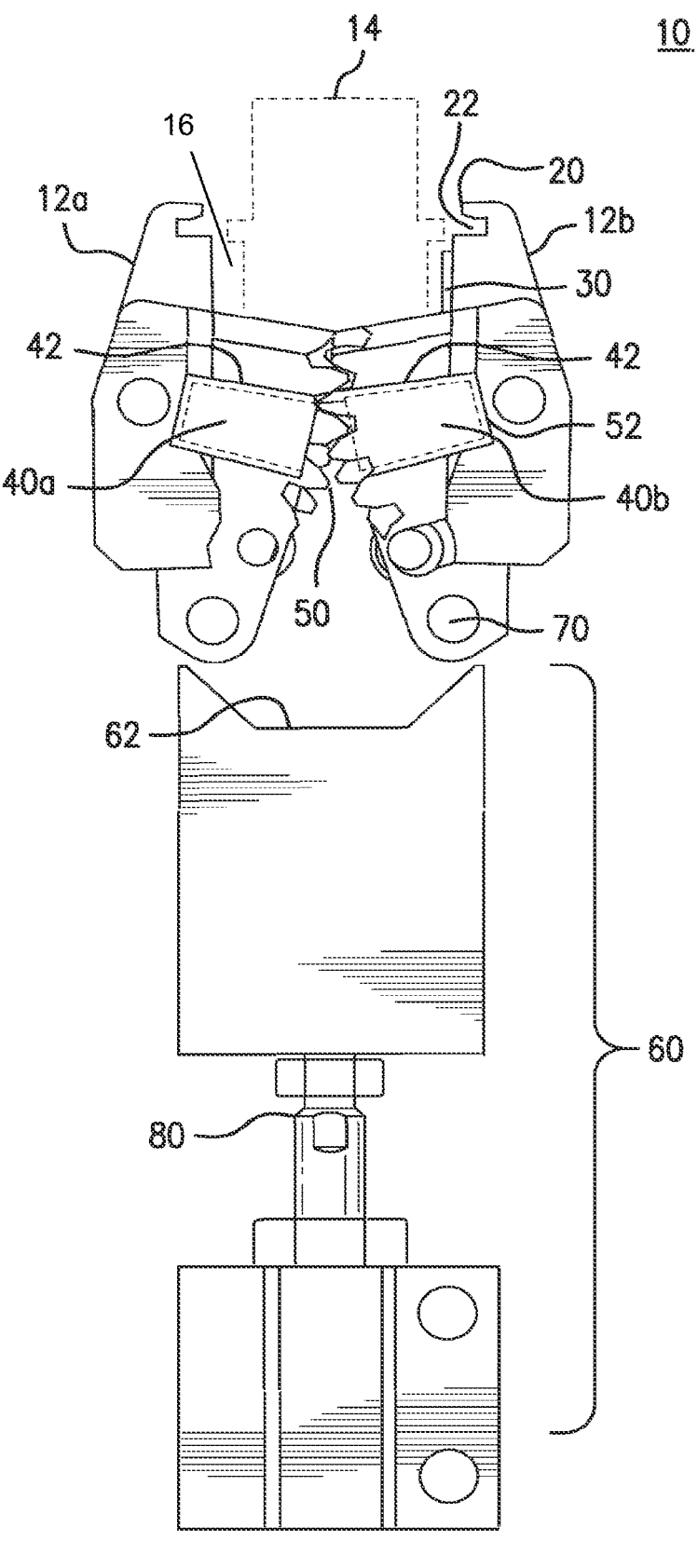

FIG. 1C provides an additional view of the cam-driven self-clamping collet 10 of FIGS. 1A and 1B. Pursuant to this direct side-view illustration of the cam 60, it will be appre-ciated that the cam face 62 may have a particular shape that is capable of driving the jaw bases 70 (and/or the rollers thereof) towards and away from each other as the cam shaft 80 drives the cam face 62 towards and away from the jaw bases. It will also be understood that, in order to synchro-nously drive the jaws 12*a, b* as discussed throughout, that each half of the cam face 62 should directly mirror the other half.

Figure 2:
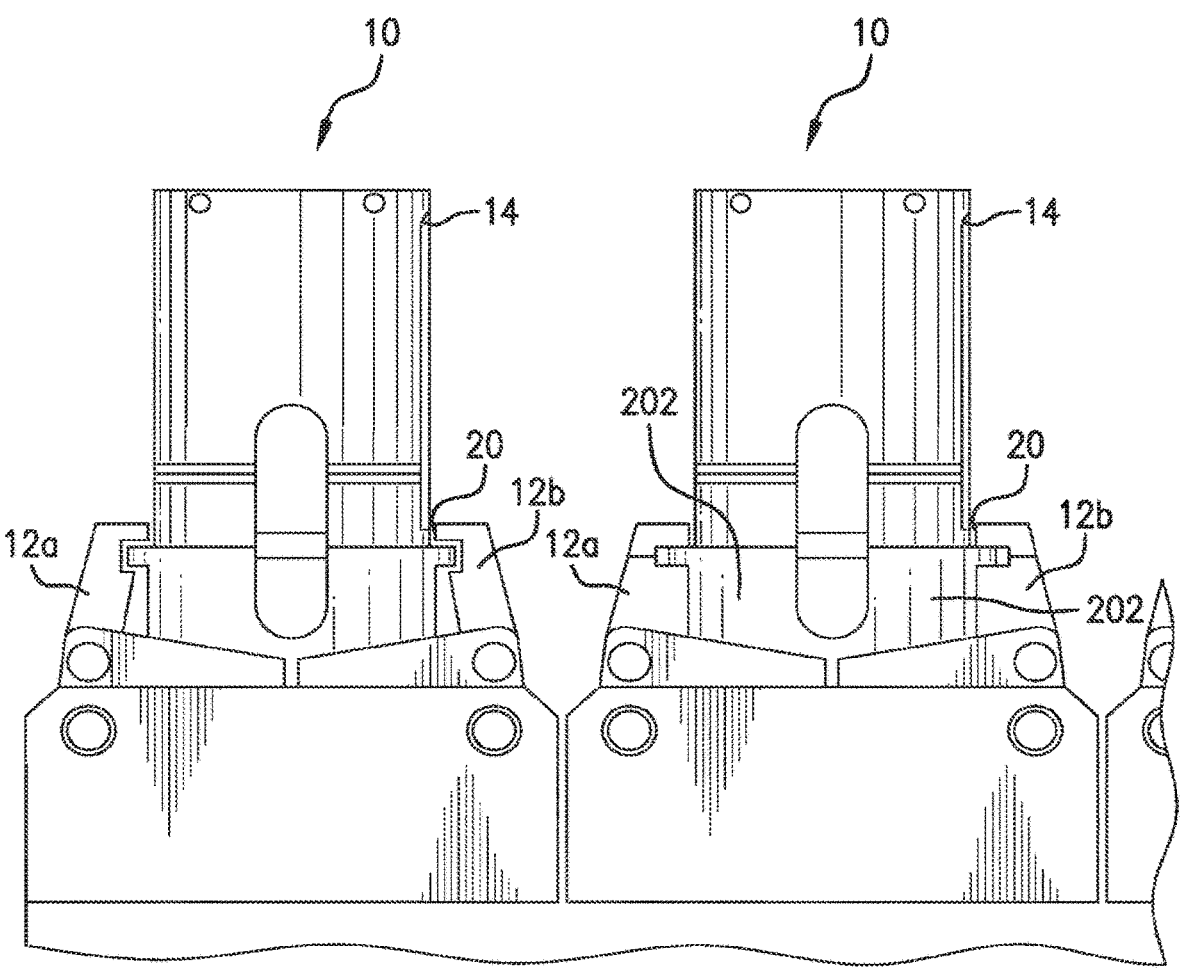
FIG. 2 is an illustration of aspects of a self-clamping collet.

FIG. 2 illustrates multiple clamping collets 10, each with a customized form fitting (to the gripped part 14) jaw geometry. Each jaw 12*a, b* has a gripping retaining lip 20, conformed to the part's geometry, to provide positive reten-tion of the part 14 upon closing of the jaws 12*a, b*.

Figure 3:
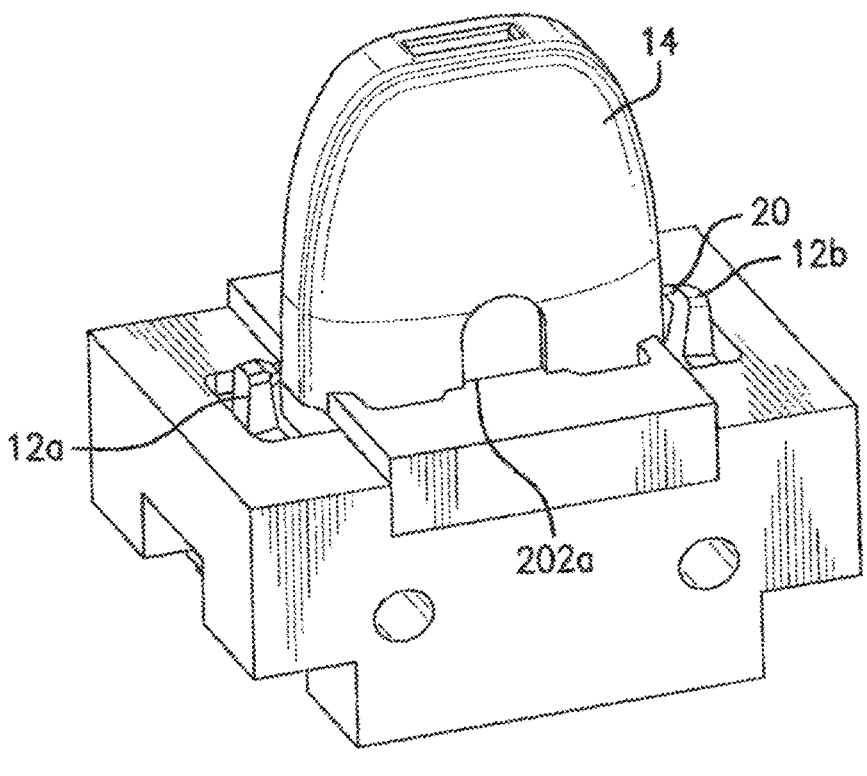
FIG. 3 is an illustration of aspects of a self-clamping collet.

In addition to the jaw-centering of the part base upon jaw closure, the jaws core block 202 may provide a form fitting geometry that matches the clamped portion of the clamped part 14 much in a manner akin to a part mold. This form fitting geometry and part-matched lip retention produces a very-closely held part registration, such as on the order of +/−25 microns, dependent upon part shape and tolerances. FIG. 3 is an isometric view of a part 14 subjected to form-fitting geometry hardware 202*a* about an extensive portion of the part 14 upon jaw closure.

FIG. 4 illustrate a cutaway view of the self clamping collet 10 and actuation cam 60. As shown, the cam 60 may serve as both the actuator of the jaws 12*a, b* and the jaw release, as FIG. 4 provide a spring-free exemplary embodi-ment.

More particularly, the cutaway view of FIG. 4A shows an extended cam 60, and hence open jaws 12*a, b*. Each jaw's inner support rollers 170 roll along the cam face 62, thereby closing the jaws 12*a, b* and, in the case of FIG. 4A, opening the jaws 12*a, b* as the rollers 170 move toward the center of the cam face 62.

FIG. 4B is a cutaway view showing the cam 60 in the retracted position. Of note, the close contact between the rollers 170 and the cam face contour causes the rollers 170 to respectively move away from the cam-face center as the cam 60 retracts, thereby effecting a closure of the jaws 12*a, b*.

Figure 5A:
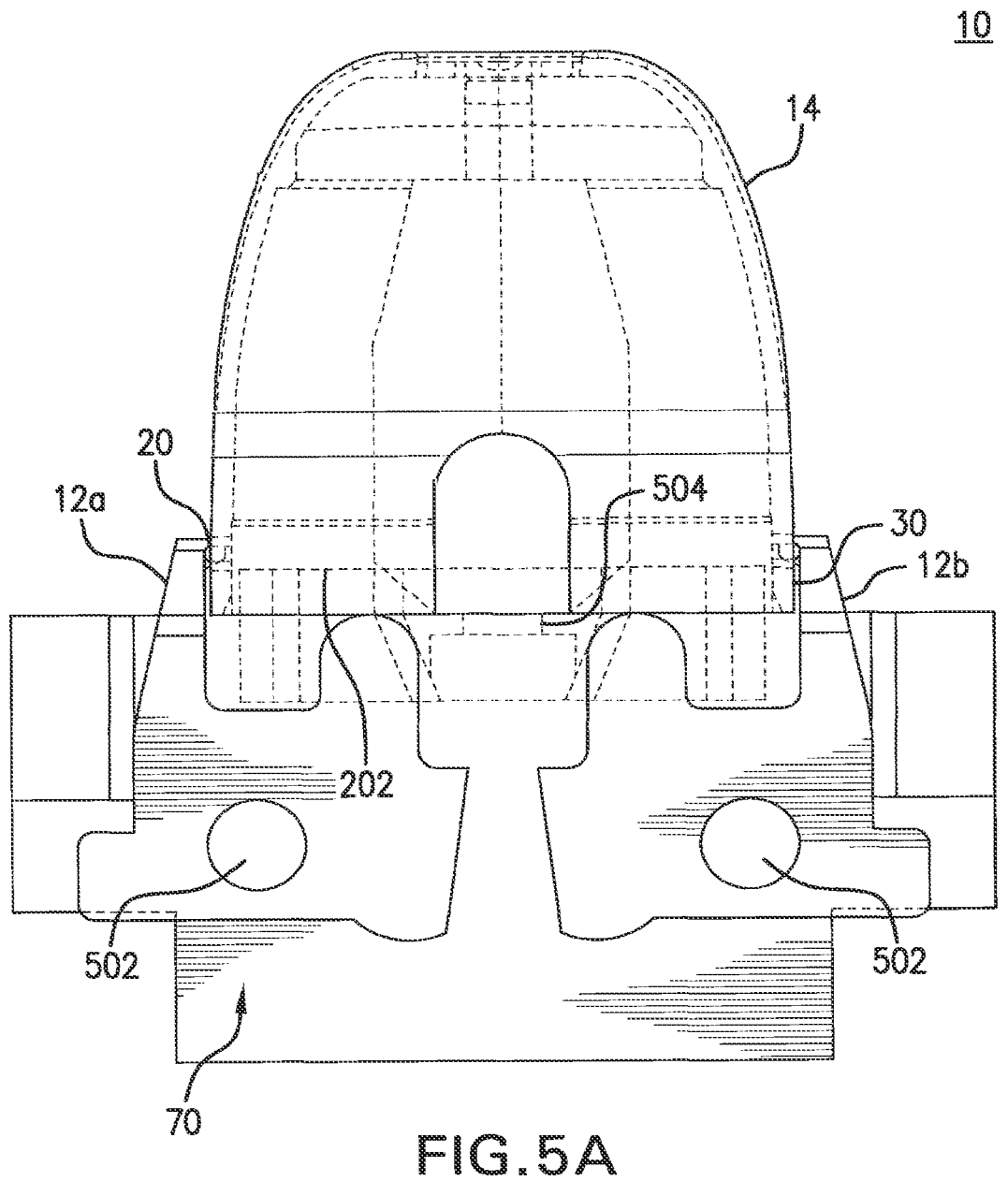
FIG. 5 are illustrations of a self-clamping collet.
Figure 5B:
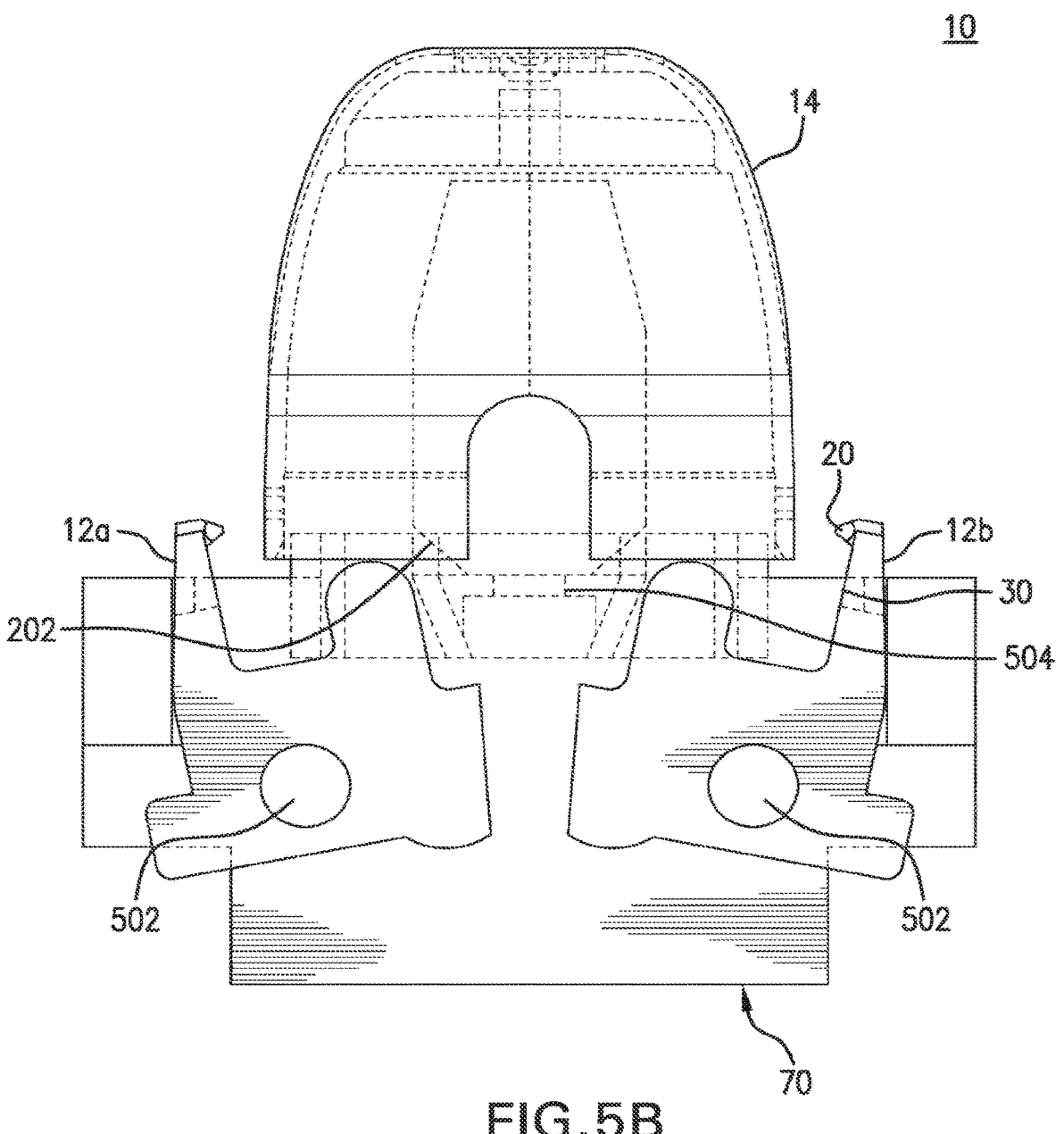

FIGS. 5A and 5B illustrate conforming jaw closure (and opening in FIG. 5B) specific to a particular part. As shown, the retaining lips 20 at the jaw tips of each jaw 12, b positively engage the specific part geometry. Moreover, in the embodiment shown, the jaw core 202 includes addition-ally aspects formed to the part geometry once the jaws close.

Also illustrated is a jaw closure in which each jaw rotates about a jaw pin 502 proximate the jaw base 70 of each jaw 12*a, b*. As discussed above, the jaw base 70 may or may not include rollers, such as in addition to the jaw rotation pin 502 shown in FIGS. 5, to more readily allow the jaws 12*a, b* to engage and follow the contours of the cam face (not shown in FIG. 5) as the cam (not shown in FIG. 5) moves towards and away from the jaw base.

Additionally evident in FIG. 5 is a contoured interior jaw geometry 30. That is, the outer faces of the part may engage with mold-like cavities within the jaw, to thereby provide high-precision registration.

The parts in FIG. 5 are relatively simple in construction and shape, including the lipped jaws, inner-jaw contouring, and respective jaw pins. Accordingly, the jaws may be readily formed via any known construction methodologies, including 3D printing or injection-molding, by way of non-limiting example.

Figure 6:
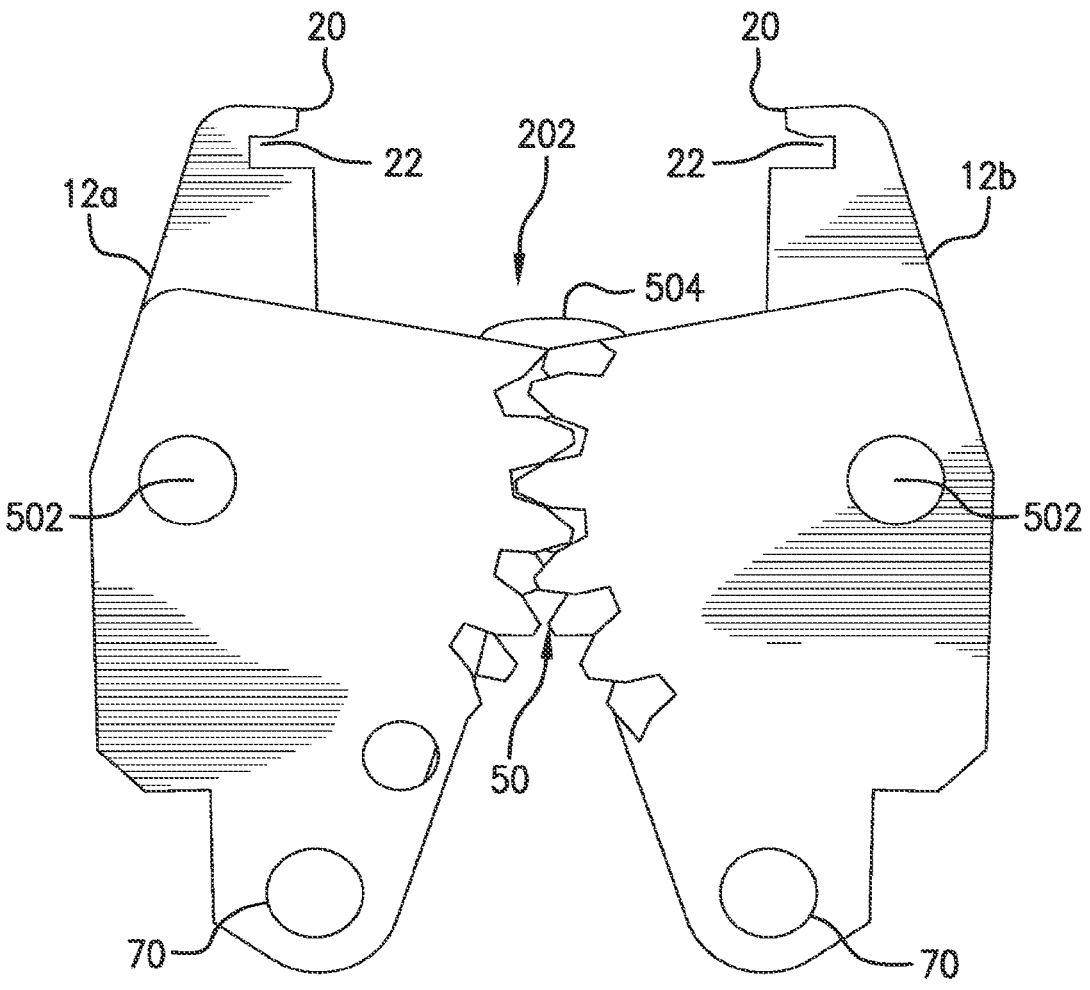
FIG. 6 is an illustration of the jaws of a self-clamping collet.

FIG. 6 illustrates jaws 12*a, 12b* of a self clamping collet, in accordance with embodiments. The jaws 12*a, b* illustrated are particular to a certain part geometry 202, and include a retaining lip 20 in accordance with that geometry.

The jaws 12*a, b* may include, such as in the core 202 of the jaw-space, an actuating pad 504. Upon pressure to the actuating pad 504, the compression spring referenced above may be tripped, thereby closing the jaws 12*a, b* upon a retained part. Of course, the geometry of the jaws 12*a, b*, as well as the spring constant of the spring discussed above, may be designed to avoid damage to the retained part in such an embodiment.

Also shown is meshed gearing 50 integral to each jaw. These integral mesh gears 50 on both sides of the jaw closure keeps the jaws synchronized and centered on the part (not shown in FIG. 6), such that side loading is minimized.

The illustrated jaws 12*a, b* may grip with modifiable grip strength, such as pursuant to the various design choices (i.e., spring loaded or not; cam drive strength; etc.) discussed throughout, and such as may be controlled by the driving of cam 60 by a control system (discussed below). Moreover, grip strength may vary based on the conditions to which the gripped part is subject, i.e., whether the part is to be retained around sharp curves, whether the part will be turned upside down, and whether the pallet is moved at high speeds, by way of example.

Figure 7:
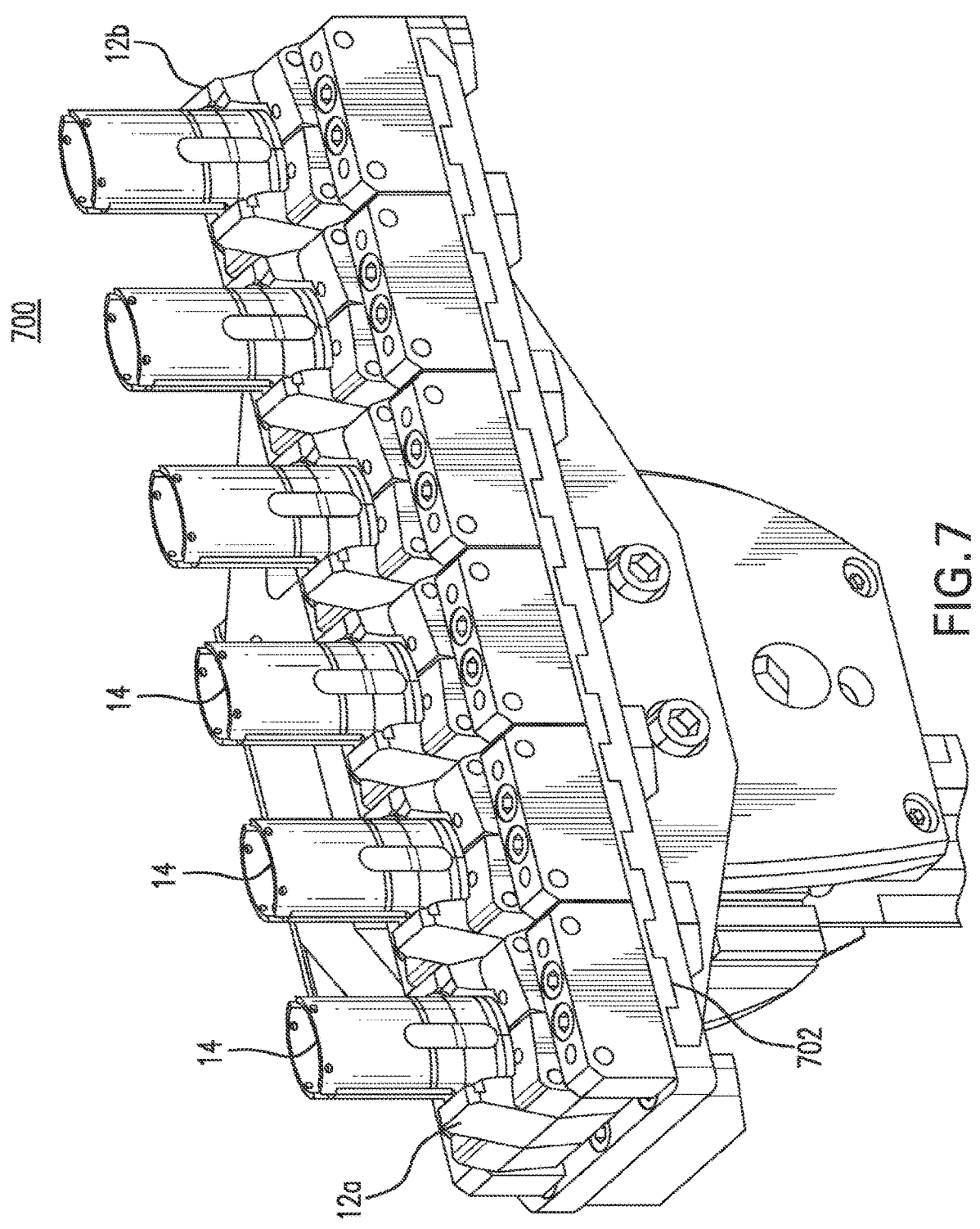
FIG. 7 is an illustration of a self-clamping multi-jaw set.

FIG. 7 illustrates a group 700 of jaws 12*a, b* dedicated for use with a single pallet, such as for multiple parts 14 to be retained per pallet. Of note, the jaws 12*a, b* and contouring of each jaw head on a grouped jaw head 700 may all be of the same type, or may differ if multiple different parts 14 are to be gripped per pallet.

For a grouped jaw set, the jaws may or may not be individually cammed. Of course, the skilled artisan will appreciate that, if the entire jaw grouping is driven by a single cam, a cam distributor 702 may reside within the group head base. The cam distributor 702 may, of course, present a different cam face, and thus a different cam face contour, to each individual jaw, such as wherein the jaws differ for different parts retained, subject to the actuation of the single cam driving the cam distributor.

A grouped jaw set 700 may include 2 or more, such as 4, 6, or 8 jaws in the set, depending upon the application. In one exemplary application, multiple set fixtures may be used to join parts on a glue joint, such as while curing. In this case, the fixtures would be placed atop each other in the same manner as mold halves.

Figure 8:
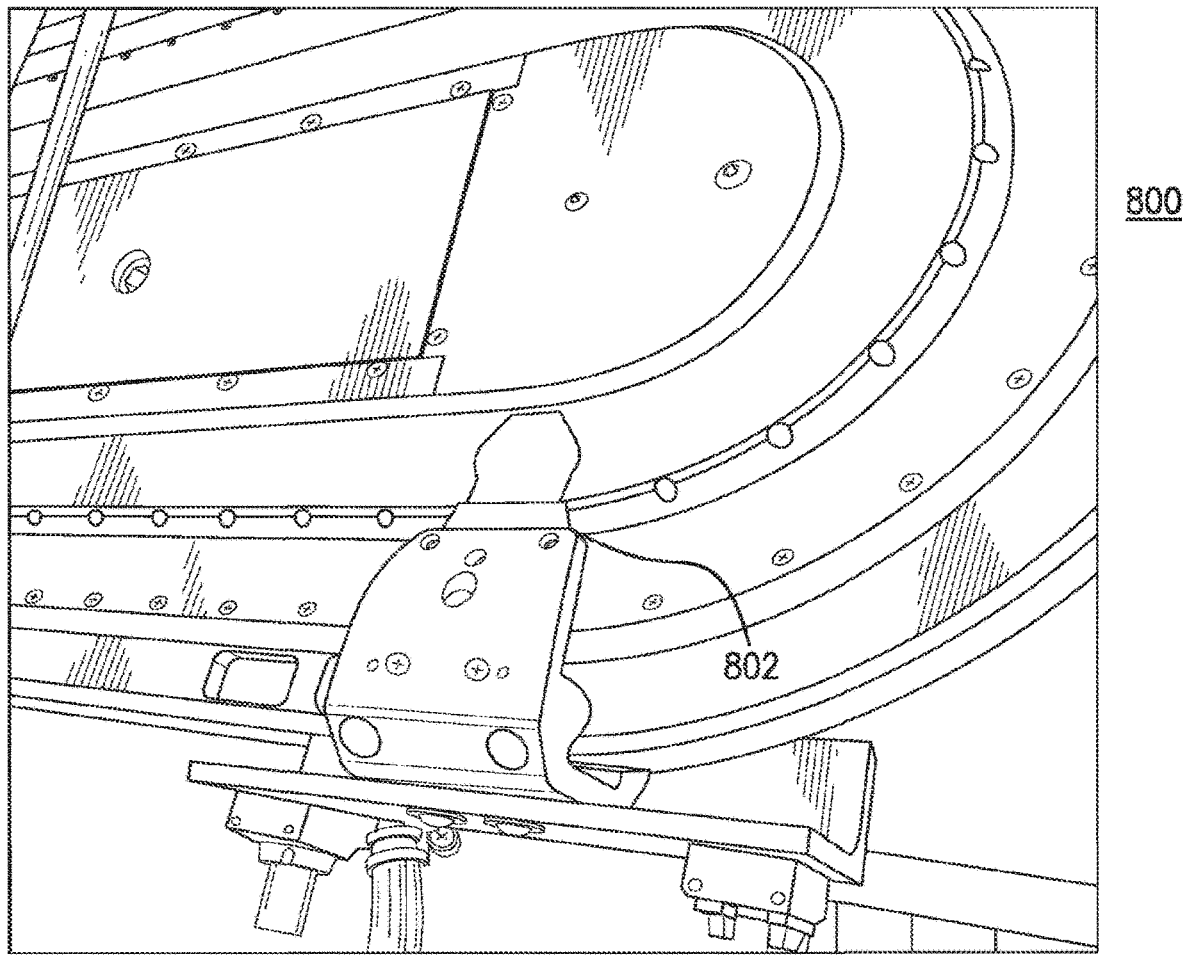
FIG. 8 is an illustration of a pallet on a conveyor system.

FIG. 8 illustrates a conveyor system 800, along which the part pallet 802 discussed throughout may travel. The conveyor system may comprise a series of straights and curves, which may be travelled at varying speeds and with dramatic starts and stops, as shown. The embodiments are employed to hold parts on these pallets, subject them to processing along the conveyor shown, and to discharge and retain those parts at the precise proper times and in the precise proper positions.

The disclosed self clamping collet may thus provide passive, i.e., no external power, high registration fixturing. The embodiments may be used with conveyor/pallet contexts, and/or may be used in relation to a pick and place end effector. In addition to the aforementioned embodiments, the disclosed collet may be useful in hazardous environments, such as under water.

The foregoing apparatuses, systems and methods may also include the control of the various robotic and cam functionality referenced throughout. Such control may include, by way of non-limiting example, manual control using one or more user interfaces, such as a controller, a keyboard, a mouse, a touch screen, or the like, to allow a user to input instructions for execution by software code associated with the robotics and with the systems discussed herein. Additionally, and as is well known to those skilled in the art, system control may also be fully automated, such as wherein manual user interaction only occurs to "set up" and program the referenced functionality, i.e., a user may only initially program or upload computing code to carry out the predetermined movements and operational sequences discussed throughout. In either a manual or automated embodiment, or in any combination thereof, the control may be programmed, for example, to relate the known positions of substrates, the robotics, the stationary point, and the relative positions there between, for example.

It will be appreciated that the herein described systems and methods may operate pursuant to and/or be controlled by any computing environment, and thus the computing environment employed not limit the implementation of the herein described systems and methods to computing environments having differing components and configurations. That is, the concepts described herein may be implemented in any of various computing environments using any of various components and configurations.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A self-clamping collet, comprising:
two opposing jaws, each comprising:
a gripping jaw tip including a retaining lip and grasping slot; and
a molded area; and
a roller at the base of each of the opposing jaws, wherein driving of a cam face into the roller causes an actuation of the opposing jaws;
gearing associated with each of the opposing jaws, wherein the gearing synchronizes the actuation of the opposing jaws; and
a centering spring residing in a tapered pocket in each of the opposing jaws applying spring pressure to both of the opposing jaws.

2. The collet of claim 1, wherein the actuation comprises an opening of the opposing jaws.

3. The collet of claim 1, wherein the actuation comprises a closing of the opposing jaws.

4. The collet of claim 1, wherein the centering spring is over-center.

5. The collet of claim 1, wherein the centering spring is a compression spring.

6. The collet of claim 1, wherein the centering spring pushes the opposing jaws apart, and wherein the actuation comprises a closing of the jaws.

7. The collet of claim 1, wherein the centering spring pushes the opposing jaws together.

8. The collet of claim 1, further comprising a spring pad between the two opposing jaws and extending through the molded area.

9. The collet of claim 8, wherein pressure applied to the spring pad causes the spring to trip and the opposing jaws to close.

10. The collet of claim 1, wherein the jaws follow a contour of a clamped part.

11. The collet of claim 1, wherein the molded area comprises a cushion comprising rubber or plastic.

12. The collet of claim 1, wherein the molded area comprises a central cavity.

13. A clamping system for a part associated with a pallet, comprising:
two opposing jaws on the pallet, each comprising:
a gripper for gripping the part; and
a jaw base, comprising:
gearing that synchronizes actuation of the opposing jaws; and
a cam interface distal from the gripper;
a centering compression spring residing in a tapered pocket in each of the opposing jaws that compresses to put pressure against both of the opposing jaws; and
an external cam shaft that drives a cam face comprising planar surfaces into the cam interfaces of the jaw base to actuate the two grippers.

14. The clamping system of claim 13, wherein the cam face angles toward a centerpoint thereof, such that the cam interfaces of the jaw base are forced toward the centerpoint upon actuation of the cam shaft.

15. The clamping system of claim 13, further comprising a spring pad between the two opposing jaws.

16. The clamping system of claim 15, wherein pressure applied to the spring pad causes the spring to trip and the opposing jaws to close.

\* \* \* \* \*